March 7, 1933. V. MERRITT 1,900,836
METHOD OF AND APPARATUS FOR PREVENTING THE BURSTING OF
LIQUID CONTAINERS SUBJECTED TO FREEZING TEMPERATURES
Filed Dec. 5, 1929 2 Sheets-Sheet 2
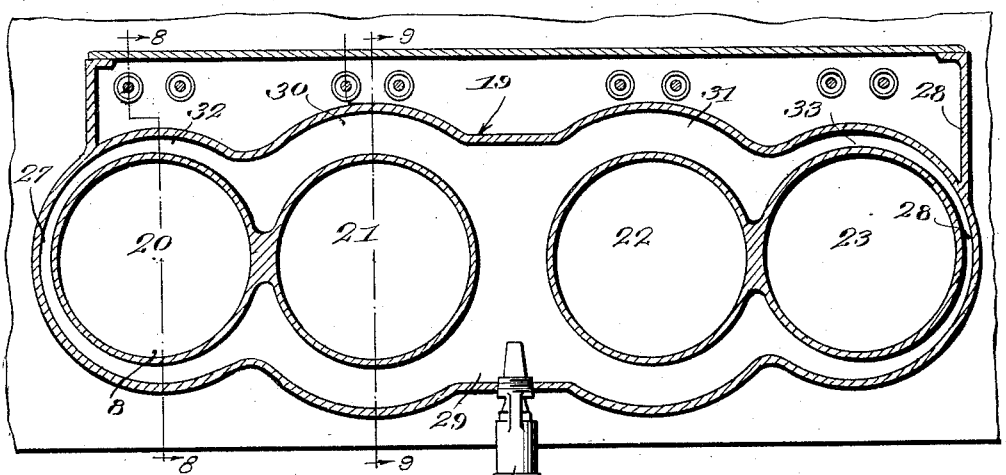
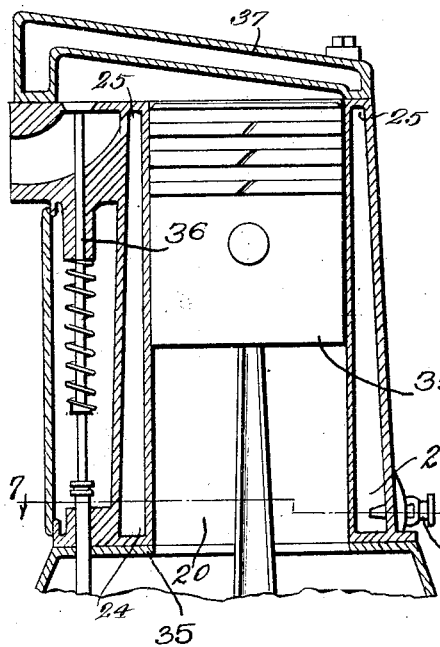
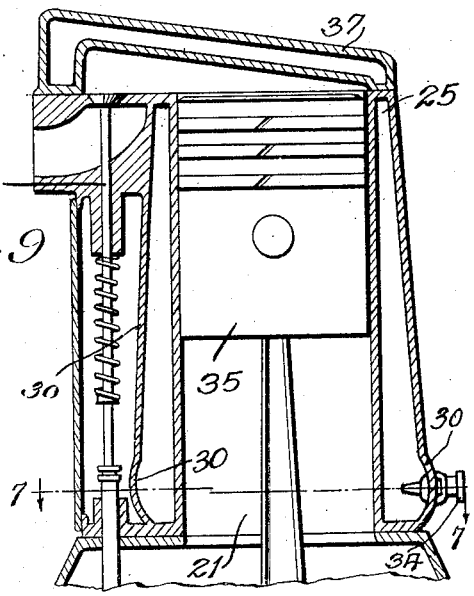
INVENTOR
Vernon Merritt
BY
ATTORNEY Patented Mar. 7, 1933

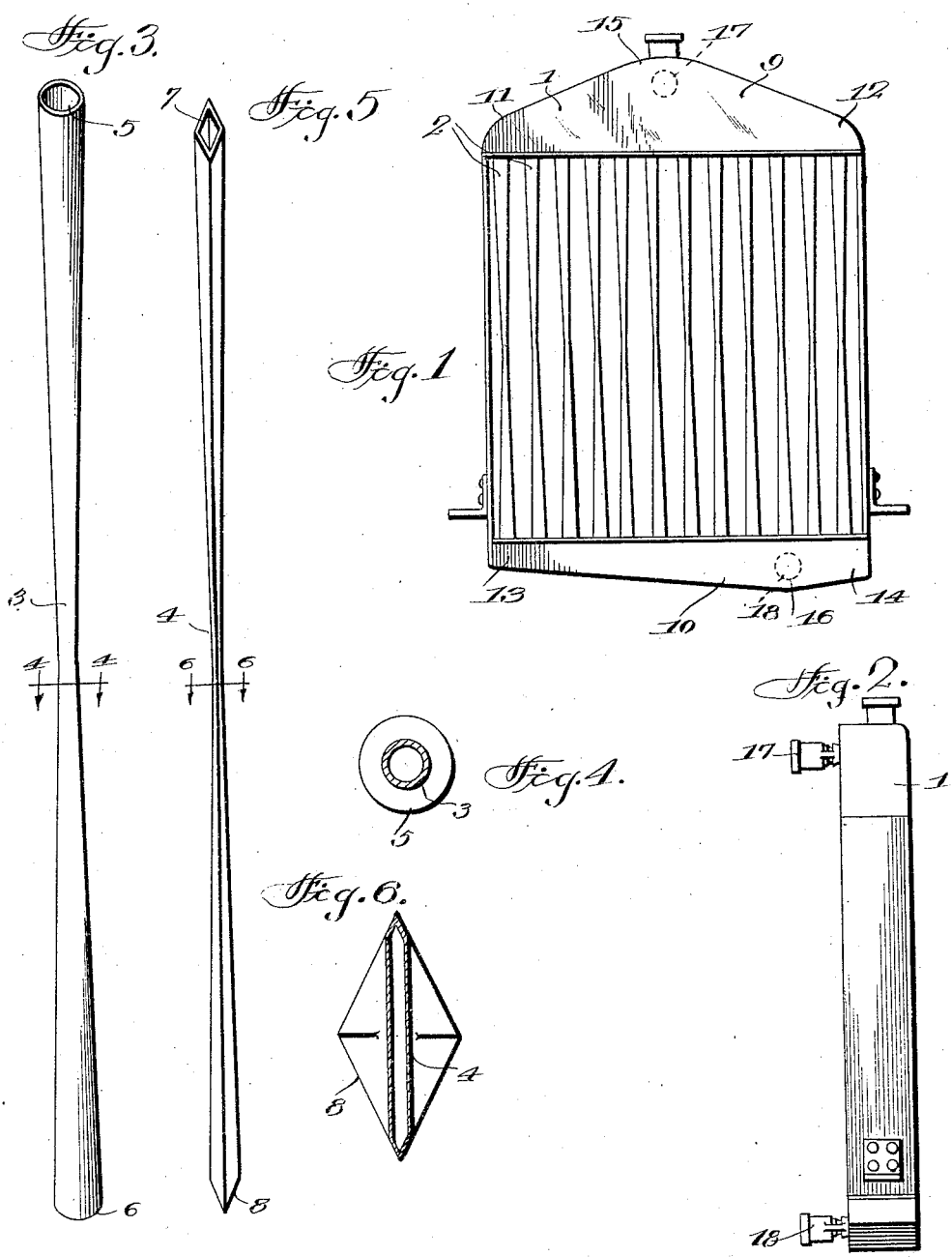

1,900,836

UNITED STATES PATENT OFFICE

VERNON MERRITT, OF MONTGOMERY, ALABAMA

METHOD OF AND APPARATUS FOR PREVENTING THE BURSTING OF LIQUID CONTAINERS SUBJECTED TO FREEZING TEMPERATURE

Application filed December 5, 1929. Serial No. 411,925.

My invention relates to improvements in liquid containers subjected to freezing temperature and is particularly adapted for use in connection with automobile radiators, automobile engine water jackets, piping and liquid containers of any description, subjected to liquid freezing temperatures, and it consists in the combinations and arrangements herein described and claimed.

An object of my invention is to so construct the liquid containing vessel that portions of the liquid contained therein will be frozen before other portions of the liquid contained therein, so that those portions of the liquid which freeze first will force by their freezing pressure the liquid which is to be frozen last to some other vessel or through an outlet provided in said vessel before freezing, thereby preventing the bursting of the vessel.

A further object of my invention is to provide a method of the class described which is easily applicable to liquid containing vessels of any nature.

Other objects and advantages will appear in the following specification and the novel features of the invention will be particularly pointed out in the appended claims.

In the accompanying drawings my invention is illustrated as applied to liquid containing vessels of three descriptions, but it is to be understood that this application is for illustrative purposes only and in no way limits the application of my method to vessels of general description.

In the drawings:

Figure 1 is a front elevational view of a radiator of an automobile constructed in accordance with my method, Figure 2 is a side elevation of Fig. 1, Figure 3 is an elevational detail view of a portion of the device, Figure 4 is a sectional view on line 4—4 of Fig. 3, Figure 5 is an elevational detail view of a modified portion of the construction, Figure 6 is a sectional view on line 6—6 of Fig. 5, Figure 7 is a sectional view on lines 7—7 of Figs. 8 and 9 of a vessel embodying my invention, Figure 8 is an elevational sectional view on line 8—8 of Fig. 7, Figure 9 is an elevational sectional view on line 9—9 of Fig. 7.

It is a well known fact that all liquids subjected to freezing temperatures start freezing at those portions which are adjacent the walls of their container, and freeze inwardly an equal distance on all sides. This being the case a liquid contained between the walls of the container will freeze solidly between said walls at that point where the center of the vessel is nearest to said walls, or in other words at that point where the space between said walls is smallest.

In carrying out my invention I make use of this principle and so design the container that the liquid in a portion thereof, freezes first and by its freezing pressure forces the liquid which would freeze last through a suitable opening provided therefor.

In the application of my method disclosed in Figures 1 to 6 inclusive, numeral 1 generally designates a conventional automobile radiator constructed so as to embody my invention. This radiator has a plurality of tubular members generally designated at 2. These tubes may be of either round or angular form as shown more clearly in Figures 3 and 5. In accordance with my invention, the central portions of these tubes have the smallest cross sectional area, as shown at Figures 3 and 4. These tubes flare outwardly towards their ends reaching their greatest cross sectional area at the ends as appears at 5, 6, 7 and 8. The top and bottom portions 9 and 10 respectively of the radiator communicating with the tops and bottoms of these tubular members 2 are constructed in accordance with my principle, similar to said tubes, providing the portions 11, 12, 13 and 14 of smallest cross sectional area and the portions 15 and 16 of the largest cross sectional area due to the progressively tapered portions of the top and bottom portions.

For permitting the egress of the liquid during the freezing and so preventing the radiator from bursting, the freeze releasable plugs or valves responsive to pressure, 17 and 18 are positioned at the points of largest cross sectional area 15 and 16. These freeze releasable plugs or valves may be of any suitable conventional construction.

From the foregoing description of this embodiment of my invention, the operation may be readily understood. The liquid contained within the radiator when subjected to freezing temperature will freeze solidly at the points 3 and 4 in the tubes 2 first. The pressure due to the expansion of the liquid in freezing will force the unfrozen liquid along the tube through the portions of greater cross sectional area and into the portions 9 and 10 of the radiator. Due to the similar construction of these portions 9 and 10 the liquid contained therein before freezing will be forced by the frozen portions of the liquid to those sections of said parts of the radiator 9 and 10 of greatest cross sectional area indicated at 15 and 16. At this stage of the freezing, the freeze releasable plugs or valves 17 and 18 will respond to the pressure within by opening, permitting the passage of the liquid from the radiator and thereby preventing the bursting of the same. It is readily understood that my invention might also be applied to radiators of honeycomb formation or any formation in use.

Figures 7 to 9 inclusive show an application of my invention to the water jacket of an ordinary four cylinder combustion engine. The water jacket generally indicated at 19 enclosing the cylinders 20 to 23 inclusive is progressively enlarged from the top 25 thereof towards the base 26 and also from the opposite ends of cylinders 20 and 23 and indicated by numerals 27 and 28 to the longitudinal center 29 thereof. As readily disclosed from an examination of Figure 7 the portions 30 and 31 of the water jackets surrounding cylinders 21 and 22 are larger than those portions 32 and 33 surrounding cylinders 20 and 23, which is in accordance with my invention. To secure the portions 30 and 31 of greater cross sectional area than the portions 32 and 33 it is necessary to construct these portions with a bulged or enlarged section as shown more clearly in Figure 9 of the drawings. At the portion 30 of greatest cross sectional area in this embodiment of my invention, the freeze releasable plug 34 which again may be of any conventional form, is inserted. The cylinder head 37 is also constructed in a similar shape.

This four cylinder combustion engine comprises the ordinary engine features, the piston 35, and valve 36, which form no part of my invention.

From the foregoing description the operation is easily understood. As in the prior construction, the liquid is forced from the portions of smallest cross sectional area 27 and 28 to the center 29 of greatest cross sectional area, wherein the freeze releasable plug is situated. This freeze releasable plug, responding to the pressure created within, opens and permits the passage of the unfrozen liquid therefrom.

I claim:—

1. A method for preventing the bursting of liquid containers subjected to freezing temperature which consists of constructing said containers of variable cross sectional area and the insertion of liquid releasing means in that portion of the container having the greatest cross-sectional area.

2. A liquid container, comprising a portion of smallest cross sectional area, a portion of greatest cross sectional area, portions between said first named portions progressively graduated, and a freeze releasable plug positioned in said portion of greatest cross sectional area, whereby the excess liquid due to freezing, is ejected.

3. A liquid container, comprising a small portion, a large portion, progressively graduated portions therebetween, and a pressure releasable valve mounted in said liquid container in said large portion, whereby excess liquid occasioned by the freezing thereof, is ejected.

4. A liquid container, comprising a plurality of tubular members, having a restricted portion substantially at their centers and being progressively enlarged from said restricted portions to their ends, chambers adapted for cooperation with the ends of said tubes, said chambers having enlarged portions, and pressure releasable valves mounted in the enlarged portions of said chambers and communicating with the enlarged portions of said tubular members, whereby the release of the excess liquid due to freezing pressure, is assured.

5. A liquid container, comprising sections of variable cross sectional area and pressure releasable valves positioned in the portion of the sections of greatest cross sectional area whereby the release of excess liquid due to freezing thereof, is assured.

6. A method for preventing the bursting of liquid containers subject to freezing temperature which consists in constructing the container with restricted portions subject to relatively quick freezing progressing to enlarged portions subject to later freezing and placing liquid releasing means in the container adjacent the point of latest freezing.

7. A method for preventing the bursting of liquid containers subject to freezing temperature which consists in shaping the container with a restricted portion progressing to an enlarged portion to bring about progressive solid freezing of the contents from the restricted portion to the enlarged portion, and providing means whereby unfrozen liquid in the container is released from the enlarged portion as freezing occurs.

8. A method for preventing the bursting of liquid containers subject to freezing temperature which consists in so shaping the container that the distance between the inner surfaces of the closest walls progressively increases, and providing liquid releasing means in the container at the point of greatest distance between said walls.

9. In a liquid container, a restricted portion, an enlarged portion, portions between said first named portions progressively enlarging, and pressure responsive means communicating with the enlarged portion for releasing liquid as freezing occurs.

10. A liquid container comprising a restricted portion, an enlarged portion, portions between said first named portions progressively graduated, and a freeze releasable plug positioned in said enlarged portion whereby the excess liquid due to freezing is ejected.

11. A liquid container comprising a plurality of tubular members having a restricted portion and having their shorter cross sectional dimensions progressively enlarged from said restricted portion, chambers adapted for cooperation with the enlarged ends of said tubes, said chambers having enlarged portions, and pressure responsive valves mounted in the enlarged portions of said chambers and communicating with the enlarged portions of said tubular members for releasing liquid at freezing temperatures.

VERNON MERRITT.